(12) United States Patent
Littrell (10) Patent No.: US 10,601,822 B2
(45) Date of Patent: Mar. 24, 2020

(54) MULTIFACTOR AUTHENTICATION DEVICE

(71) Applicant: Brett Littrell, Fremont, CA (US)

(72) Inventor: Brett Littrell, Fremont, CA (US)

( * ) Notice: Subject to any disclaimer, the term of this patent is extended or adjusted under 35 U.S.C. 154(b) by 16 days.

(21) Appl. No.: 15/723,914

(22) Filed: Oct. 3, 2017

(65) Prior Publication Data
US 2018/0234414 A1 Aug. 16, 2018

Related U.S. Application Data

(60) Provisional application No. 62/457,514, filed on Feb. 10, 2017.

(51) Int. Cl.
| | |
|---|---|
| H04L 29/06 | (2006.01) |
| G06F 21/32 | (2013.01) |
| G06K 9/00 | (2006.01) |
| H04L 9/32 | (2006.01) |
| G06F 21/33 | (2013.01) |
| G06F 3/14 | (2006.01) |

(52) U.S. Cl.
CPC .......... *H04L 63/0861* (2013.01); *G06F 21/32* (2013.01); *G06F 21/33* (2013.01); *G06K 9/00013* (2013.01); *G06K 9/00892* (2013.01); *H04L 9/3228* (2013.01); *H04L 9/3231* (2013.01); *H04L 9/3239* (2013.01); *H04L 63/0838* (2013.01); *G06F 3/14* (2013.01); *G09G 2354/00* (2013.01); *H04L 2463/082* (2013.01)

(58) Field of Classification Search
CPC ... H04L 63/0861; H04L 9/3228; G06F 21/32; G06F 21/33; G06F 3/14; G06K 9/00006; G06K 9/00013; G06K 9/00221; G06K 9/00597; G09G 2354/00
See application file for complete search history.

(56) References Cited

U.S. PATENT DOCUMENTS

| | | | | |
|---|---|---|---|---|
| 2001/0016909 | A1* | 8/2001 | Gehrmann | H04L 63/0823 713/171 |
| 2002/0198848 | A1* | 12/2002 | Michener | G06Q 20/04 705/75 |
| 2003/0145223 | A1* | 7/2003 | Brickell | G06F 21/33 726/10 |
| 2005/0086497 | A1* | 4/2005 | Nakayama | G06F 21/32 713/185 |
| 2006/0195759 | A1* | 8/2006 | Bower | H03M 13/09 714/758 |

(Continued)

OTHER PUBLICATIONS

RD Ideas "pcProx Enroll & Wiegand Converter", 2013 (Year: 2013).*

*Primary Examiner* — David Le
(74) *Attorney, Agent, or Firm* — Donald R. Boys; Central Coast Patent Agency LLC (57) ABSTRACT

An authentication device has internal circuitry operable to execute specific digital processing, a digital token, an image-capturing mechanism and circuitry, and an output interface. The image-capturing mechanism captures an image providing biometric identity of a user, the internal circuitry executing a first specific digital process creates a first digital string unique to the image providing biometric identity, the internal circuitry executing a second specific digital process combines the first digital string with the digital token, creating a combined digital string, and the combined digital string is provided to the output interface.

18 Claims, 5 Drawing Sheets

(56) References Cited

U.S. PATENT DOCUMENTS

| | | | |
|---|---|---|---|
| 2007/0016795 A1* | 1/2007 | Asano | G06Q 20/4014 |
| | | | 713/182 |
| 2007/0115940 A1* | 5/2007 | Kamen | H04L 63/0853 |
| | | | 370/352 |
| 2008/0168544 A1* | 7/2008 | von Krogh | G06F 21/34 |
| | | | 726/6 |
| 2009/0183008 A1* | 7/2009 | Jobmann | H04L 9/0866 |
| | | | 713/186 |
| 2014/0032898 A1* | 1/2014 | Yu | H04N 21/4181 |
| | | | 713/156 |
| 2015/0082399 A1* | 3/2015 | Wu | G06F 21/6209 |
| | | | 726/6 |
| 2018/0048472 A1* | 2/2018 | Pirrwitz | H04L 63/0815 |

\* cited by examiner

Fig. 1

Biometric code:
1001010001111010101011110101000110101011101010111010101011101010101011101001

Token OTP: 101101111000111111001

Calculations to combine the biometric code value with the OTP using an offset:

$$\boxed{\text{XOR}}\begin{array}{l}10010100011110101010\\10110111000111111001\end{array}$$ Merge bits 0-20
00100011011001010011   Decimal 144979

$$\boxed{\text{XOR}}\begin{array}{l}11110101000110101011\\00100011011001010011\end{array}$$ Merge bits 20-40
11010110011111111000   Decimal 878584

$$\boxed{\text{XOR}}\begin{array}{l}11010110011111111000\\10101011101010101110\end{array}$$ Merge bits 40-60
01111101110101010110   Decimal 515414

$$\boxed{\text{XOR}}\begin{array}{l}01111101110101010110\\10101011101001\end{array}$$ Merge bits 60-74
11010110011100010110   Decimal 878358

Calculations to combine the biometric code value with the OTP without an offset:

$$\boxed{\text{XOR}}\begin{array}{l}10010100011110101010\\10110111000111111001\end{array}$$ Merge bits 0-20
00100011011001010011   Decimal 144979

$$\boxed{\text{XOR}}\begin{array}{l}11110101000110101011\\00100011011001010011\end{array}$$ Merge bits 20-40
11010110011111111000   Decimal 878584

$$\boxed{\text{XOR}}\begin{array}{l}11010110011111111000\\10101011101010101110\end{array}$$ Merge bits 40-60
01111101110101010110   Decimal 515414

$$\boxed{\text{XOR}}\begin{array}{l}01111101110101010110\\00000010101011101001\end{array}$$ Merge bits 60-74
11010110011100010110   Decimal 878358

MULTIFACTOR AUTHENTICATION DEVICE

CROSS-REFERENCE TO RELATED APPLICATIONS

The present application claims priority to provisional patent application 62/457,514, filed Feb. 10, 2017, and all disclosure of the parent application is incorporated herein at least by reference.

BACKGROUND OF THE INVENTION

1. Field of the Invention

The present invention is in the technical area of devices and methods for authorization of persons to transact digitally with security-enhanced sites, and pertains more specifically to multi-factor authentication.

2. Description of Related Art

The technology area to which the present invention belongs is often termed cybersecurity, and the term is used in this document. A major issue in cybersecurity today is an ability for persons, acting on their own, or representing specific enterprises, to verify their identity in a proposed digital transaction with a high level of surety.

Authentication may be established by using what are termed factors. A simple example is something you know. This is a basis for password authorization. A person may be tasked, when negotiating with a digital entity, to choose a password, which that person will know, and the digital site (such as a bank) will save that password. When a person seeks to transact with the site in future, the site will ask for a name (username) and a password, providing digital fields for entry. If the password entered compares exactly with the saved password for that username, the person may be authorized to transact, such as to review data on the site. If the password is the only piece of information required for authorization, this may be termed single-factor, or one-factor authentication.

It is well-known that single-factor authentication is rather easy to compromise. Typically, a password is weak for a couple of reasons, but foremost is a tendency for people to use weak passwords that can be easily compromised, as well as reusing a same password for several accounts, so that once a password is compromised on one system it may be compromised on multiple systems. Other issues with this type of factor is possible interception of the passwords, resetting of the passwords, the usage of the passwords from anywhere around the world etc. Many enterprises, for these reasons, have moved beyond single-factor authentication, even though it is often complex for both the users and enterprises to verify identity beyond 1 factor.

A second factor that may be added to strengthen security is What You Are. This factor typically may be added as a biometric scan, such as a fingerprint, facial recognition, iris scan and so on. A potential weakness here is that a clear-text password is visible to everyone around you, fingerprints can be lifted from any object you touch, facial recognition can be pulled from, for example, a social media site, and iris recognition can be pulled from a HD camera, like the one on a person's phone when they take a selfie.

A third factor that may be added is What You Have. Typically, this third factor is in the form of a token or a program that creates a token or a one-time password (OTP). While in combination with a What you know factor and very intelligent backend services this can be pretty secure. However, such a third factor requires a lot of administration as well as cost for the token devices. This fact has led to less expensive and less secure options that rely on a key imported into a phone or other personal device that in turn can be compromised to gain this factor.

The present inventor, with these facts in mind, has decided that what is clearly needed is combination of two factors into a single device, to reduce complexity and increase security.

BRIEF SUMMARY OF THE INVENTION

In one embodiment of the invention, an authentication device is provided, comprising internal circuitry operable to execute specific digital processing, a digital token, an image-capturing mechanism and circuitry, and an output interface. The image-capturing mechanism captures an image providing biometric identity of a user, the internal circuitry executing a first specific digital process creates a first digital string unique to the image providing biometric identity, the internal circuitry executing a second specific digital process combines the first digital string with the digital token, creating a combined digital string, and the combined digital string is provided to the output interface.

In one embodiment, the internal circuitry operable to execute specific digital processing comprises a processor executing specific software. Also in one embodiment, the internal circuitry operable to execute specific programmed digital processing comprises firmware providing the specific digital processing. Also in one embodiment, the digital token is changed in value with respect to time by a third specific digital process. In one embodiment, the image capturing mechanism captures a fingerprint image. And in one embodiment the image capturing mechanism captures a retinal scan.

In one embodiment, the output interface is a display screen, providing a decimal number equivalent to the combined digital string. Also in one embodiment the output interface is a communication port connecting the internal circuitry of the device to the Internet network.

In another aspect of the invention an authentication method is provided, comprising capturing, in a single authentication device, by an image-capturing mechanism and circuitry, an image providing biometric identity of a user, creating, by a first digital process accomplished by internal circuitry operable to execute specific digital processing, a first digital string unique to the image providing biometric identity, combining, by a second digital process accomplished by the internal circuitry operable to execute specific digital processing, the first digital string with a digital token, creating a combined digital string, and providing the combined digital string to an output interface.

In one embodiment of the method the creating and combining steps are accomplished by internal circuitry comprising a processor executing specific software. Also in one embodiment the creating and combining steps are accomplished by internal circuitry comprising firmware. Also in one embodiment the method further comprises a step wherein the digital token is changed in value with respect to time by a third specific digital process.

In one embodiment, the capturing step is accomplished by capturing an image of a fingerprint of the user. And in one embodiment of the method, the capturing step is accomplished by capturing an image of a retina of the user.

In one embodiment, in the providing step, a decimal number equivalent to the combined digital string is displayed on a display screen. Also in one embodiment, the output interface is a communication port connecting the internal circuitry of the device to the Internet network.

In yet another aspect of the invention an authentication system is provided, comprising a single device comprising internal circuitry operable to execute specific digital processing, a digital token, an image-capturing mechanism and circuitry, and an output interface, and a network-connected server executing server software on a processor, from a non-transitory medium. In this system the image-capturing mechanism captures an image that provides biometric identity of a user, the internal circuitry executing a first specific digital process creates a first digital string unique to the image that provides biometric identity, the internal circuitry, executing a second specific digital process, combines the first digital string with the digital token, creating a combined digital string, a decimal number equivalent to the combined digital string is provided to a display, the user enters the decimal number in an input field at a web site hosted by an enterprise where the user seeks authentication, and the server, executing the server software, uses the decimal number to perform comparison to stored data regarding the user, and authenticates the user, or not.

In one embodiment of the system, the internal circuitry operable to execute specific digital processing comprises one of or a combination of a processor executing specific software and firmware. In one embodiment, the digital token is changed in value with respect to time in concert in the single device and in the stored data at the server. And in one embodiment the capturing step is accomplished by capturing an image of a fingerprint of the use, or capturing an image of a retina of the user.

DETAILED DESCRIPTION OF THE INVENTION

In embodiments of the present invention factors two and three are combined in a single device, and a combined one-time password (OTP) is created to be transmitted to a server where authentication is desired. In one implementation, the single device is a token device, storing a token, often also termed in the art a one-time password, which is known to a site where a user of the device seeks authentication. This token may be changed with respect to time as an additional impediment to undesired access. The token device may be internet capable, and the combined OTP created on the device may be transmitted directly to a server where authentication is desired. In some other embodiments, the token device may generate and display the combined OTP, which a user may transmit by entering the combined OTP into a field in an interactive interface provided by the server where authentication is desired.

Figure 1:
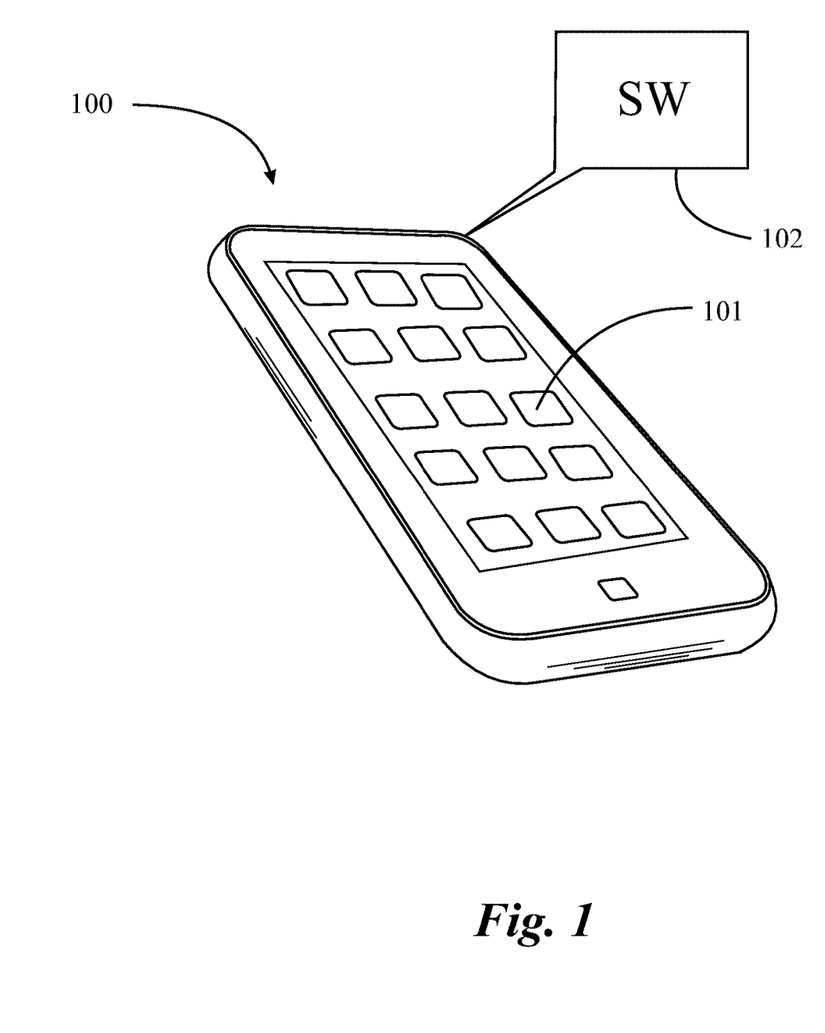
FIG. 1 is a perspective view of a device in an embodiment of the present invention.

FIG. 1 is a perspective view of a smartphone 100 as the token device in an embodiment of the invention. In this example, the device is a smart telephone, capable of network connection, execution of coded instructions on an internal processor, capable of displaying graphic and character output, and having an image-capturing capability. These several functions are well-known functions of a smart telephone. The invention, however is not limited to a smart telephone as a device, but may be practiced by a number and variety of other devices, such as tablet devices and some wearable-tech devices, as long as the device used has the inherent functionality to practice the invention.

Device 100 in the example of FIG. 1 displays a plurality of interactive icons 101, that are interactive to launch different applications that may be executed by a processor as a part of circuitry of the device. The applications are collectively represented in FIG. 1 as SW 102. In an embodiment of the invention, factors 2 and 3, that are respectively what you are and what you have, are combined, the combination is processed on device 100 by either execution of an application as a part of SW 102 or through a separate hardware device hardcoded with the process, prior to submitting the combined OTP to a digital site of an enterprise as authentication for it to be processed. This unique process greatly increases the surety as well as simplicity from a user and administration perspective. With this process and method, a person cannot imitate another person without first having to steal a physical device and having to acquire a defined biometric attribute. Even interception of these factors separately will not reveal the information to compromise an account, because the token OTP may be constantly or repeatedly changed, making it impossible to deduce the current valid authentication string or to separate the factors to gain the combined factors without having all factors known.

Given device 100, executing an app according to an embodiment of the invention, or processing by firmware, providing factor three, what you have, the device also has image-capture capability to capture a fingerprint as biometric input, for factor two, what you are. A digital value representing the fingerprint is cryptographically added to the token, combining factors three and two. For additional security the combination of factors three and two may be used also with a known password or PIN (factor one, what you know), in which case three-factor authentication is accomplished.

The process proceeds by hashing the biometric information that is inputted to device 100, and combining that hashed information with the token OTP, producing the combined OTP. The biometric information can be separate from the authentication request and compared to existing authentication hashes, since the token OTP is known. The biometric input is not sent separately in a request for authentication.

In one embodiment, device 100 may show the combined OTP. When a possessor of device 100 places a finger on a scanning element (image capture) of the device, the device scans the fingerprint and combines a value derived from the fingerprint hash with the token to create a completely different number. The concept may be expanded to separate devices implanted in phones, software in wearable tech, and other devices, and expanding the biometric inclusion to features beyond fingerprints, such as retinal scans, biorhythmic scans, facial scans and so on.

Figure 3:
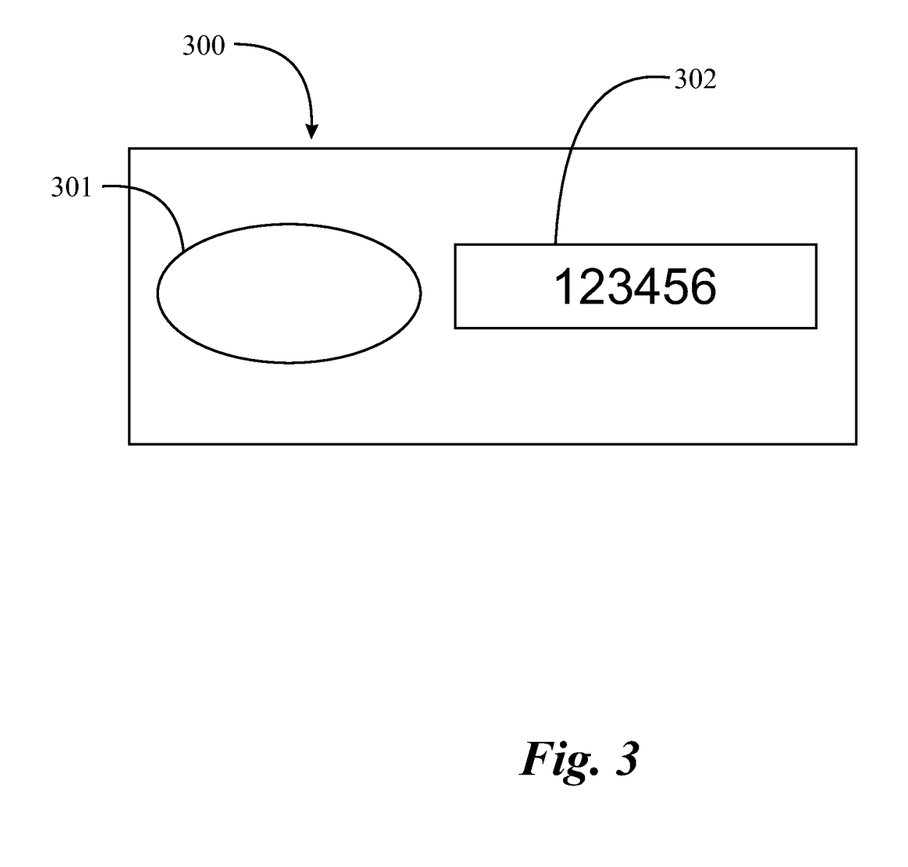
FIG. 3 illustrates a key-ring device useful in one embodiment of the invention.

In one embodiment, illustrated by FIG. 3, a device 300 may comprise a biometric reader 301, in this case a fingerprint scanner, separate from any other devices, with a display screen. In this device, the combined OTP could just be displayed on a simple LED screen 302, reflecting the two factors in a simple string of characters. While the fingerprint is not placed on the reader 301, the display 302 will just show the OTP token, when a finger is placed on the reader the fingerprint is scanned, the unique information is hashed and combined with the starter token to create the new, combined OTP based on the two factors. The user may read the new, combined OTP from the LED display and enter that into a log-in field at a site for authentication. The site, in this case, recognizes the user by username, and has stored data to correspond and compare the combined OTP the user enters.

In embodiments of the invention, since a properly encoded password will rely on both possession of a device to perform coded instructions or firmware to calculate the combined one-time password (OTP), and a physically unique attribute of the user, it satisfies the two factors of something you have and something you are. In order to maintain integrity of the authentication, all calculations are confined to the single device performing the two-factor combination. Therefore, in the instance of wearable technology, the OTP calculation and the biometric calculation will be confined to that single device. For example, wearable smart glasses might both read a retinal image to calculate the authentication value for the retinal scan as well as to calculate the combined OTP. These factors can be combined to produce a unique OTP through hashing of the biometric data and XOR combining this with the token OTP.

Figure 2:
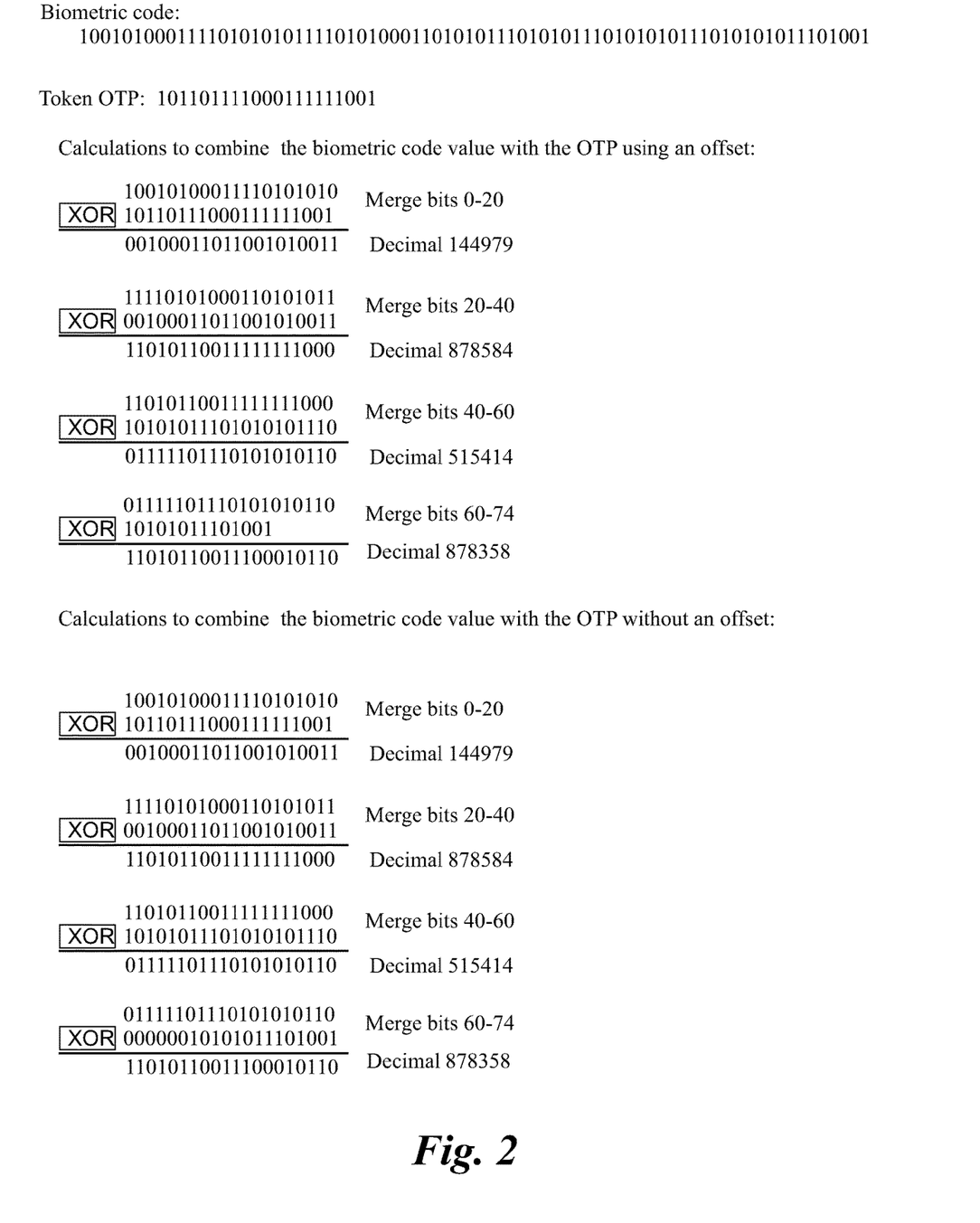
FIG. 2 illustrates a computation sequence in an embodiment of the invention.

FIG. 2 illustrates a sequence of operations in an embodiment of the invention for creating a combined OTP to be transmitted for authentication in two ways, one by an offset, and another without offset.

Since the hash of the fingerprint code is not reversible, exposure of the hash will not compromise the biometrics. In addition, without the token there is no way to reliably deduce the hash in the first place. Upon initialization of the token there may be an offset value if the token OTP binary length is not equal on the last recursion of the binary combination. This may or may not be needed, dependent upon the hashing binary length divisibility by the token length. The default setting is that the binary lengths are equivalent. Further, there is another method of moving the final frame of binary digits to start with the least significant bit, this could then assume a padding for the final value. However, this will not cause a greater fluctuation in numbers as using the most significant bits for the last recursion combination.

Initialization of the device can be accomplished in multiple ways; two examples are described here.

Example 1

Biometric scan is completed and uploaded to an authentication server; seed from token is uploaded to authentication server. Biometric hashing occurs on the server. Upon receipt of the auth token the hash and token are combined and compared to stored data to determine validity. In this embodiment, the device must have internet connection, a biometric scanner producing an image, and a stored token.

Example 2

Seed from device is uploaded to the server with the appropriate offset. Device issues 1 factor token only to initialize device. Device then issues multifactor code in order for the server to extract the hash. Upon extraction of the hash, the server stores this hash. It is also possible to attempt multiple biometric scans in the case of slightly different results such as those with higher error rate scans like fingerprints.

Figure 4:
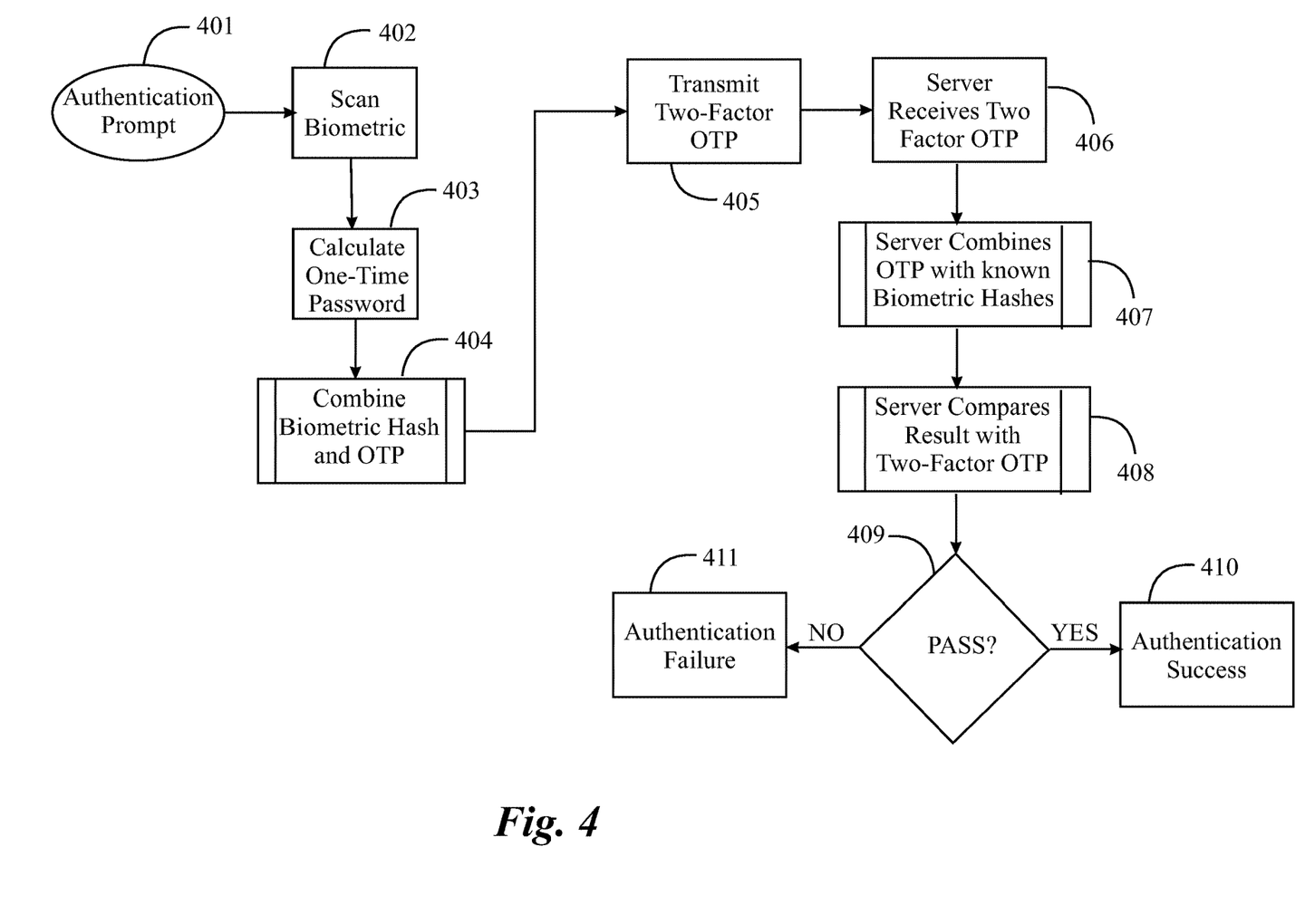
FIG. 4 is a flow diagram depicting a process for two-factor authentication in an embodiment of the invention.

FIG. 4 is a flow chart illustrating steps in an authentication process according to an embodiment of the present invention. At step 401 a user is prompted for authentication. At step 402 the user inputs the biometric data, such as by a fingerprint scanner. At step 403 a token OTP is created, and at step 404 the token OTP is combined with the biometric hash, creating the two-factor combined OTP unique to the invention. At step 405 the two-factor combined OTP is transmitted, and at step 406 received at a server where authentication is desired. The server, at step 407, combines the two-factor OTP with known biometric hashes for the user and compares result at step 408. If the comparison is a success, authentication is successful, and if not, authentication fails.

Figure 5:
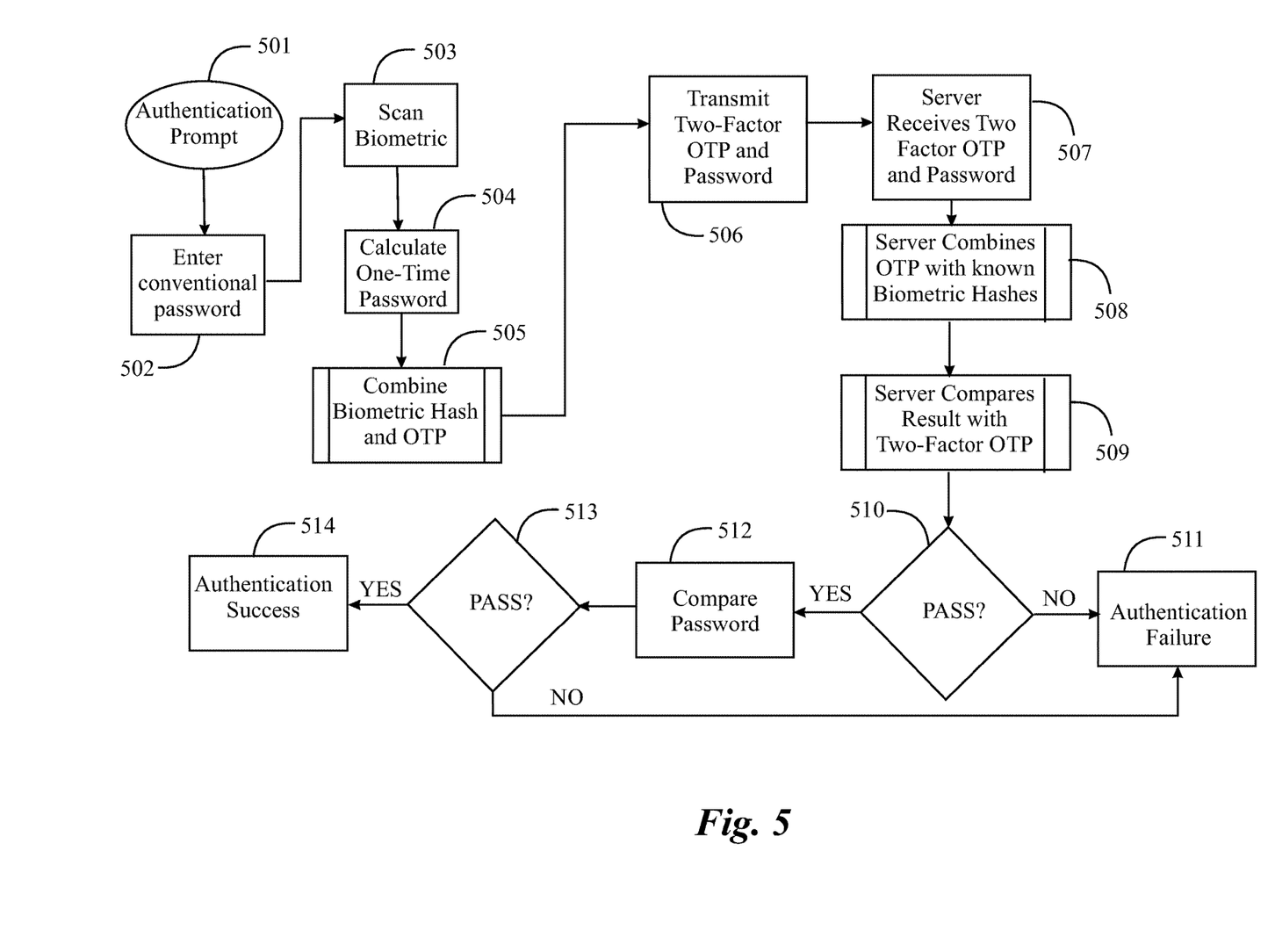
FIG. 5 is a flow diagram depiction of a process for three-factor authentication in an embodiment of the invention.

FIG. 5 illustrates the process of authentication using a two-factor OTP as in FIG. 4, but combining that with a PIN or conventional password. The steps from 501 through 505 are the same as for FIG. 4, except, at step 502 the user enters a conventional password. At step 506 the two-factor combined OTP and the conventional password are transmitted to the server. If the two-factor comparison is valid, then the server also compares the conventional password for success or failure, and three-factor authentication is thus accomplished.

The skilled person will realize that there are variations in the embodiments described that will still fall within the scope of the unique steps of the invention. The inventor believes the combination of two factors in the single device is unique over what has been done in the art prior to the priority date of the present application

The invention claimed is:

1. A computerized device, comprising:
   a digital processor;
   a stored digital token unique to the device and having a first bit length;
   an image-capturing mechanism; and
   an output interface;
   wherein the image-capturing mechanism captures an image providing biometric identity of a user, the processor creates a first digital string unique to the image providing biometric identity, creates a one-time password from the digital token and the first digital string by a process comprising in a first step combining by a first XOR logical operation a first sequential portion of the first digital string of a bit length equal to the first bit length, with the digital token, producing an intermediate digital string of the first bit length, and in a second step combining by a second XOR logical operation the intermediate digital string with a second sequential portion of the first digital string, exclusive of the first portion, having a bit length equal to the first bit length, and provides the one-time password to the output interface.

2. The computerized device of claim 1 wherein the processor comprises firmware.

3. The computerized device of claim 1 wherein the digital token is changed in value with respect to time.

4. The computerized device of claim 1 wherein the image capturing mechanism captures a fingerprint image.

5. The computerized device of claim 1 wherein the image capturing mechanism captures a retinal scan.

6. The computerized device of claim 1 wherein the output interface is a display screen, providing a decimal number for the one-time password.

7. The authentication device of claim 1 wherein the output interface is a communication port connecting the device to the Internet network.

8. A method, comprising:
capturing, in a computerized device having a processor and an output interface, by an image-capturing mechanism, an image providing biometric identity of a user;
creating, by the processor, a first digital string unique to the image providing biometric identity;
creating a one-time password from a stored digital token unique to the device and the first digital string by a process comprising in a first step combining by a first XOR logical operation a first sequential portion of the first digital string of a bit length equal to the first bit length, with the digital token, producing an intermediate digital string of the first bit length, and in a second step combining by a second XOR logical operation the intermediate digital string with a second sequential portion of the first digital string, exclusive of the first portion, having a bit length equal to the first bit length; and
providing the one-time password to the output interface.

9. The method of claim 8 wherein the processor comprises firmware.

10. The method of claim 8 further comprising a step wherein the digital token is changed in value with respect to time.

11. The method of claim 8 wherein the capturing step is accomplished by capturing an image of a fingerprint of the user.

12. The method of claim 8 wherein the capturing step is accomplished by capturing an image of a retina of the user.

13. The method of claim 8 wherein the output interface is a display screen, and in the providing step, a decimal number equivalent to the one-time password is displayed on a display screen.

14. The method of claim 8 wherein the output interface is a communication port connecting the device to the Internet network.

15. An authentication system, comprising:
a computerized device comprising a processor, a stored digital token of a first bit length, unique to the device, an image-capturing mechanism, and a display; and
a network-connected server executing server software on a processor, from a non-transitory medium;
wherein the image-capturing mechanism captures an image that provides biometric identity of the user, the processor creates a first digital string unique to the image that provides biometric identity, creates a one-time password from the digital token and the first digital string by a process comprising in a first step combining by a first XOR logical operation a first sequential portion of the first digital string of a bit length equal to the first bit length, with the digital token, producing an intermediate digital string of the first bit length, and in a second step combining by a second XOR logical operation the intermediate digital string with a second sequential portion of the first digital string, exclusive of the first portion, having a bit length equal to the first bit length, the processor displays a decimal number equivalent to the one-time password on the display, and the user provides the decimal number to the network-connected server, and the server, executing the server software, uses the decimal number to perform comparison to stored data regarding the user, and authenticates the user, or not.

16. The system of claim 15 wherein the processor comprises one of or a combination of a processor executing specific software and firmware.

17. The system of claim 15 wherein the digital token is changed in value with respect to time in concert in the computerized device and in the stored data at the server.

18. The system of claim 15 wherein the image captured is an image of a fingerprint of the user, or an image of a retina of the user.

* * * * *